(12) United States Patent  
Smith et al.

(10) Patent No.: US 7,810,736 B2
(45) Date of Patent: Oct. 12, 2010

(54) TRANSACTION PRODUCT WITH ELECTRICAL PLUG

(75) Inventors: David B. Smith, Falcon Heights, MN (US); Travis M. Robertson, Minnetonka, MN (US); Ted C. Halbur, Lino Lakes, MN (US); Erin M. Borkowski, Andover, MN (US); Adam W. Reynolds, Minneapolis, MN (US); Timothy P. Clegg, Manhatten Beach, CA (US); Primoz Samardzija, Marina del Ray, CA (US)

(73) Assignee: Target Brands, Inc., Minneapolis, MN (US)

( * ) Notice: Subject to any disclaimer, the term of this patent is extended or adjusted under 35 U.S.C. 154(b) by 397 days.

(21) Appl. No.: 11/965,480

(22) Filed: Dec. 27, 2007

(65) Prior Publication Data

US 2009/0166430 A1    Jul. 2, 2009

(51) Int. Cl.
*G06K 19/06* (2006.01)
(52) U.S. Cl. ................................................. 235/491
(58) Field of Classification Search ............... 235/491
See application file for complete search history.

(56) References Cited

U.S. PATENT DOCUMENTS

| | | | |
|---|---|---|---|
| 3,351,268 A | | 11/1967 | Schroeder |
| 3,598,986 A | * | 8/1971 | Love .......................... 362/253 |
| 4,055,014 A | * | 10/1977 | Schmidt et al. ............... 40/442 |
| 4,299,041 A | | 11/1981 | Wilson |
| D285,121 S | * | 8/1986 | Schwartz ..................... D26/26 |
| D352,564 S | | 11/1994 | Marischen |
| 5,387,108 A | | 2/1995 | Crowell |
| 5,577,918 A | | 11/1996 | Crowell |
| D377,535 S | | 1/1997 | Shulman |
| 5,789,733 A | | 8/1998 | Jachimowicz et al. |

(Continued)

FOREIGN PATENT DOCUMENTS

GB    2277482 A    11/1994

(Continued)

OTHER PUBLICATIONS

King, Christopher N., "Electroluminescent Displays," available at www.planar.com/advantages/whitepapers/docs/ ELD_200307.pdf at least as early as Oct. 18, 2006 per the Internet archive provided at www.archive.org.

(Continued)

*Primary Examiner*—Thien M. Le
*Assistant Examiner*—Christle I Marshall
(74) *Attorney, Agent, or Firm*—Griffiths & Seaton PLLC

(57) ABSTRACT

A transaction product, which is configured to interface with and receive electrical power from an electrical socket, includes a support member, an electrical circuit and an account identifier. The electrical circuit is coupled to the support member and includes an electrical plug and an electrically driven device electrically coupled with the electrical plug. The electrical plug includes at least two blades extending from the support member. The at least two blades are configured to interface with the electrical socket such that electrical power from the electrical socket is transferred to the electrically driven device via the electrical plug. The account identifier links the transaction product to an account or record, wherein the account identifier is machine readable. Other cards, products, assemblies and methods of using such cards, products and assemblies are also disclosed.

24 Claims, 11 Drawing Sheets

U.S. PATENT DOCUMENTS

| | | | |
|---|---|---|---|
| 5,845,425 A * | 12/1998 | Leake et al. ............... 40/725 |
| D404,508 S | 1/1999 | Marischen |
| 5,918,909 A | 7/1999 | Fiala et al. |
| 5,927,846 A | 7/1999 | Sinclair |
| 6,019,284 A | 2/2000 | Freeman et al. |
| 6,068,183 A | 5/2000 | Freeman et al. |
| 6,070,990 A | 6/2000 | Dalton et al. |
| 6,109,762 A | 8/2000 | Hallgrimsson et al. |
| 6,302,559 B1 | 10/2001 | Warren |
| 6,402,039 B1 | 6/2002 | Freeman et al. |
| 6,409,360 B2 | 6/2002 | Contant et al. |
| 6,447,143 B2 | 9/2002 | Krietzman et al. |
| 6,454,435 B1 | 9/2002 | Altman |
| 6,508,569 B2 | 1/2003 | Krietzman et al. |
| 6,527,400 B2 | 3/2003 | Dickie et al. |
| 6,533,436 B2 | 3/2003 | Krietzman et al. |
| 6,543,809 B1 | 4/2003 | Kistner et al. |
| 6,762,583 B2 * | 7/2004 | Ho et al. ............... 320/107 |
| 6,769,618 B1 | 8/2004 | Finkelstein |
| 6,817,532 B2 | 11/2004 | Finkelstein |
| 6,902,116 B2 | 6/2005 | Finkelstein |
| 2001/0053076 A1 * | 12/2001 | Chien ............... 362/84 |
| 2002/0112250 A1 | 8/2002 | Koplar et al. |
| 2002/0143697 A1 | 10/2002 | Gotfried |
| 2002/0169608 A1 | 11/2002 | Tamir et al. |
| 2003/0107884 A1 | 6/2003 | Krietzman et al. |
| 2003/0192209 A1 | 10/2003 | Yeh |
| 2004/0177002 A1 * | 9/2004 | Abelow ............... 705/14 |
| 2004/0238625 A1 | 12/2004 | Walker et al. |
| 2004/0246704 A1 * | 12/2004 | Burdick ............... 362/95 |
| 2005/0207165 A1 | 9/2005 | Shimizu et al. |
| 2005/0211785 A1 | 9/2005 | Ferber et al. |
| 2006/0065748 A1 * | 3/2006 | Halbur et al. ............... 235/493 |
| 2006/0077684 A1 * | 4/2006 | Yuen ............... 362/555 |
| 2006/0157555 A1 | 7/2006 | Dean et al. |
| 2006/0161439 A1 | 7/2006 | Selg et al. |
| 2006/0289657 A1 * | 12/2006 | Rosenberg ............... 235/492 |
| 2008/0221714 A1 * | 9/2008 | Schoettle ............... 700/90 |

OTHER PUBLICATIONS

Hart, Jeffrey A., et al., "A History of Electroluminescent Displays," available at www.indiana.edu/~hightech/fpd/papers/ELDs.html, Sep. 1999.

* cited by examiner

TRANSACTION PRODUCT WITH ELECTRICAL PLUG

BACKGROUND OF THE INVENTION

Stored-value cards and other transaction cards come in many forms. A gift card, for example, is a type of stored-value card that includes a pre-loaded or selectively loaded monetary value. In one example, a consumer buys a gift card having a specified value for presentation as a gift to another person. In another example, a consumer is offered a gift card as an incentive to make a purchase. A gift card, like other stored-value cards, can be "recharged" or "reloaded" at the direction of the bearer. The balance associated with the gift card declines as the gift card is used, encouraging repeat visits to the retailer or other provider issuing the gift card. Additionally, the gift card generally remains in the user's purse or wallet, serving as an advertisement or reminder to revisit the associated retailer. Gift cards and other transaction cards provide a number of advantages to both the consumer and the retailer.

SUMMARY OF THE INVENTION

One aspect of the present invention relates to a transaction product configured to interface with and receive electrical power from an electrical socket. The transaction product includes a support member, an electrical circuit and an account identifier. The electrical circuit is coupled to the support member and includes an electrical plug and an electrically driven device electrically coupled with the electrical plug. The electrical plug includes at least two blades extending from the support member. The at least two blades are configured to interface with the electrical socket such that electrical power from the electrical socket is transferred to the electrically driven device via the electrical plug. The account identifier links the transaction product to an account or record, wherein the account identifier is machine readable. Other related products and methods are also disclosed and provide additional advantages.

BRIEF DESCRIPTION OF THE DRAWINGS

Embodiments of the invention will be described with respect to the figures, in which like reference numerals denote like elements, and in which.

DETAILED DESCRIPTION

The following detailed description merely provides examples of the invention and is not intended to limit the invention or the application and uses of the invention. Furthermore, there is no intention to be bound by any theory presented in the preceding background of the invention or the following detailed description of the invention.

A gift card or other transaction product is adapted for making purchases of goods and/or services from e.g., a retail store or website. According to one embodiment, an original consumer buys the transaction product to give a recipient who in turn is able to use the transaction product at a retail store or setting to pay for goods and/or services. The transaction product, according to embodiments of the present invention, provides the consumer and recipient with extra functionality in addition to the ability to pay for goods and/or services with the transaction product. In particular, the transaction product presents the original consumer and/or other bearer of the transaction product with non-transactional functionality.

More specifically, in one example, the transaction product includes an electrical plug and is configured to be selectively illuminated, for example, to serve as a night light, or to otherwise be selectively powered. The electrical plug is configured to selectively interface with an electrical socket such that electricity from the electrical socket powers the transaction product, more specifically, the light included therein. In one embodiment, the light is an electroluminescence (EL) light panel and is configured to turn on (i.e., to be illuminated) when the electrical plug is positioned within an electrical socket and to turn off when the electrical plug is removed from the electrical socket. In one embodiment, the additional, non-transactional functionality of the transaction product promotes sale and gifting of the transaction product.

Figure 6:
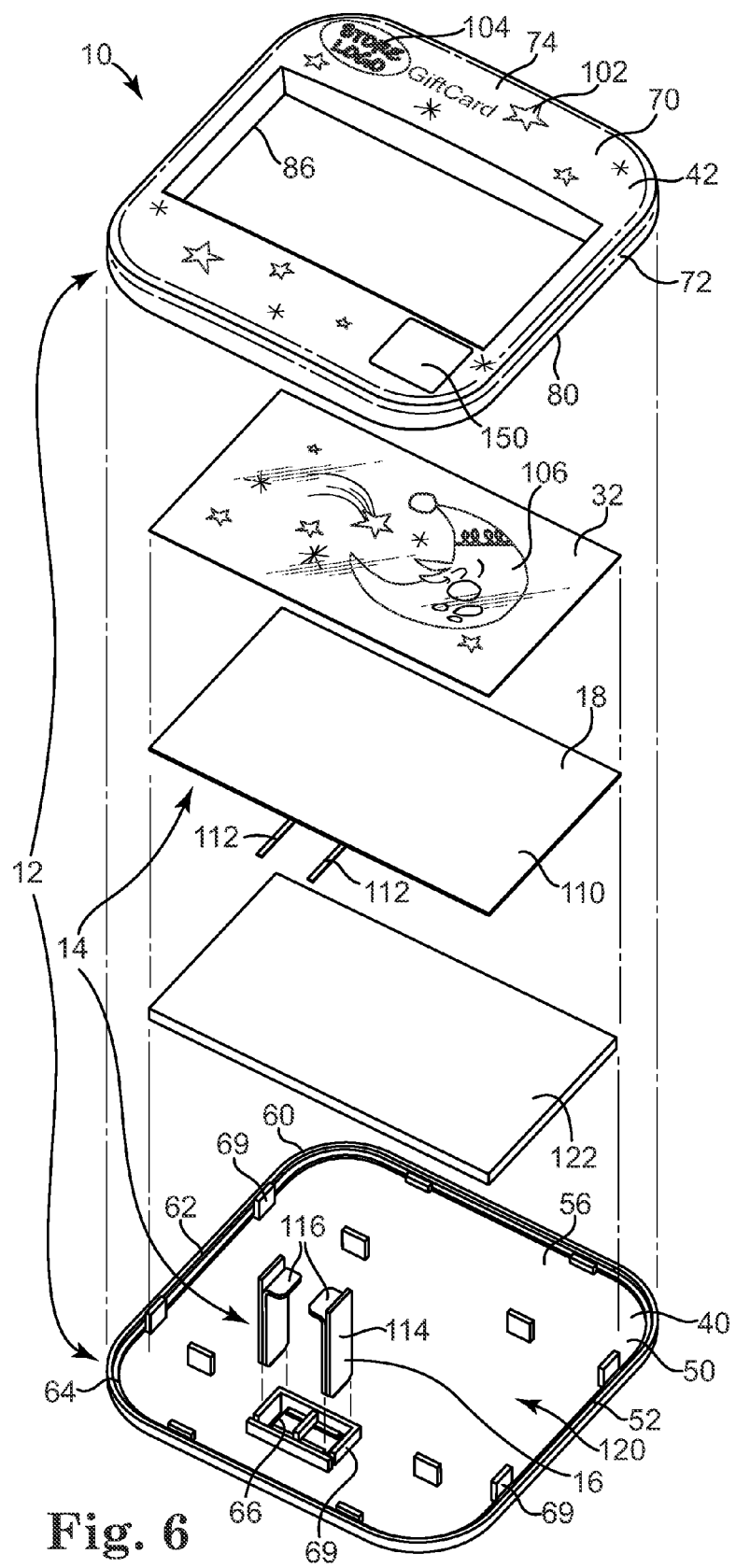
FIG. 6 is an exploded, perspective view illustration of the transaction product of FIG. 1, according to one embodiment of the present invention.

Turning to the figures, FIGS. 1-5 illustrate one embodiment of a transaction product 10 such as a stored-value product (e.g., gift card, phone card, etc.), credit product, etc. according to the present invention. Transaction product 10 is configured to be used toward the purchase and/or use of goods and/or services and includes an enclosure or housing 12 and an electrical circuit or assembly 14 (FIG. 6). In one embodiment, electrical assembly 14 is at least partially enclosed within housing 12. In one example, electrical assembly 14 includes an electrical plug 16 (or male connector) configured to interface with an electrical socket (e.g., an alternating current socket or electrical outlet) such that transaction product 10 receives electrical power from the electrical socket. Electrical assembly 14 further includes an electrically driven device 18 (FIG. 6), for example, a light, configured to be turned on (e.g., illuminated) when electrical plug 16 interfaces with the electrical socket as will be further described below.

Transaction product 10 includes an account identifier 20 (FIG. 3) such as a bar code, magnetic strip, a smart chip or other electronic device, a radio frequency identification (RFID) device or other suitable identifier readily machine readable by a point-of-sale terminal or other account access station or kiosk. Account identifier 20 indicates an account or record to which transaction product 10 is linked. The account or record of the monetary or other balance on transaction product 10 optionally is maintained on a database, other electronic or manual record-keeping system or, in the case of "smart" cards for example, on a chip or other electronic device(s) on transaction product 10 itself. Accordingly, by scanning account identifier 20, the account or record linked to transaction product 10 is identified and can subsequently be activated, have amounts debited therefrom and/or have amounts added thereto.

In one embodiment, account identifier 20 includes a character string or code 22 (e.g., a number and/or letter string) configured to provide additional security to the user of transaction product 10 and/or configured to be read by a bearer of transaction product 10 to facilitate use of transaction product 10 for web site or other purchases outside of brick-and-mortar type retail establishments. With the above in mind, account identifier 20 is one example of means for linking transaction product 10 with an account or record, and scanning of account identifier 20 is one example of means for activating or loading value on transaction product 10.

Referring to the exploded perspective view of FIG. 6, in one embodiment, transaction product 10 includes housing 12, electrical assembly 14 and an overlay or window 32. In one embodiment, housing 12 includes a first member 40 and a second member 42, for example, where first member 40 is a base and second member 42 is a cover. In one embodiment, base 40, as described with reference to FIGS. 3 and 6, generally includes a primary panel 50 and a side wall 52. Primary panel 50 is substantially planar and defines an outside surface 54 (FIG. 3) and an inside surface 56 (FIG. 6) opposite outside surface 54. In one embodiment, primary panel 50 is generally rectangular or is otherwise shaped as a square, circle, oval, star or any other suitable shape.

Side wall 52 extends from inside surface 56 away from outside surface 54 and, in one example, substantially about an entire perimeter of primary panel 50. In one embodiment, side wall 52 extends with a generally perpendicular orientation relative to primary panel 50. Side wall 52 extends from primary panel 50 to define an inside edge 60 opposite primary panel 50. In one example, inside edge 60 is formed as a stepped edge including a first portion 62 and a second portion 64. First portion 62 extends from primary panel 50 a further distance than second portion 64 extends from primary panel 50, as illustrated with reference to FIG. 6. In one example, first portion 62 extends generally about a perimeter of second portion 64. In this respect, inside edge 60 is formed as a stepped edge with the lower, second portion 64 being positioned just inside higher, first portion 62. In one embodiment, at least first portion 62 forms curved or chamfered corners at each corner, if any, defined by side wall 52.

In one embodiment, primary panel 50 defines apertures 66, which extend entirely through primary panel 50. Each aperture 66 is configured to receive a plug member 68 of electrical plug 16 included in electrical assembly 14. For example, where electrical plug 16 is a type A plug (e.g., a North American/Japanese 2-pin plug), primary panel 50 defines two substantially rectangular apertures 66 each sized and positioned to receive one of the two plug members 68 of electrical plug 16 as will be further described below. Other electrical plug types may also be used and the number, shape, size and position of apertures 66 can be adjusted accordingly to receive each member of a particular plug type. For example, three apertures 66 may be formed to each receive a different one of the three plug members of a type B plug (e.g., an American 3-pin or U-ground plug).

In one example, protrusions 69 extend from inside surface 56 of primary panel 50 in a direction substantially parallel to side wall 52. In one example, each protrusion 69 is positioned to facilitate assembly of transaction product 10, for instance, to facilitate positioning of portions of electrical assembly 14 relative to base 40. Such protrusions 69 may be positioned adjacent or near to apertures 66 to facilitate positioning of electrical plug 16 relative to base 40 and/or may be positioned to facilitate positioning of other portions of electrical assembly 14 such as electrically driven device 18. Other features configured to facilitate alignment and coupling of base 40 and cover 42 are also contemplated and will be apparent to those of skill in the art upon reading the present application.

One embodiment of cover 42 is illustrated with reference to FIGS. 1, 2, 6 and 7. Cover 42 generally includes a primary panel 70 and a side wall 72. Primary panel 70 is substantially planar, but may be formed with a curved or other suitable contour, for example, as illustrated in FIGS. 1-5. Primary panel 70 defines an outside surface 74 (FIGS. 1, 2 and 6) and an inside surface 76 (FIG. 7) opposite outside surface 74. In one embodiment, primary panel 70 is generally sized similarly to primary panel 50 of base 40. Side wall 72 extends from inside surface 76 about a substantial entirety of a perimeter of primary panel 70. For example, side wall 72 extends with a generally perpendicular orientation relative to primary panel 70.

Side wall 72 extends from primary panel 70 to collectively form an inside edge 80 opposite primary panel 70. In one embodiment, inside edge 80 is a stepped edge including a first portion 82 and a second portion 84. In one embodiment, first portion 82 extends from primary panel 70 a smaller distance than second portion 84 extends from primary panel 70 and extends around the perimeter of second portion 84. In this respect, inside edge 80 is formed as a stepped edge with higher, second portion 84 being positioned just inside lower, first portion 82. In one embodiment, the corners of inside edge 80 formed at corners of side wall 72, if any, are rounded or chamfered.

In one example, cover 42 or, more specifically, primary panel 70 defines an opening or aperture 86 extending through primary panel 70. Aperture 86 is sized and shaped as desired to allow access or viewing of at least a portion of electrical assembly 14. In one embodiment, aperture 86 is sized similarly to and shaped slightly smaller than the size and shape of electrically driven device 18. In one example, aperture 86 is substantially rectangular, circular or oval and/or is generally centered laterally and/or longitudinally on primary panel 70.

In one embodiment, cover 42 includes a plurality of protrusions 88 extending from inside surface 76 of primary panel 70 in a direction substantially parallel to side wall 72. The plurality of protrusions 88 are configured to facilitate alignment and coupling of components of electrical assembly 14 therewith, as will be further described below.

In one embodiment, primary panel 70 includes an internal wall 90 (see, e.g., FIG. 7 where a portion of window 32 is cut away for illustrative purposes to show internal wall 90) extending away from inside surface 76 of cover 42 with an orientation that, in one embodiment, is substantially parallel to the extension of side wall 72 from inside surface 76. Internal wall 90 extends from inside surface 76 to define an edge 92 opposite primary panel 70. In one example, internal wall 90 is positioned adjacent to and extends around a substantial entirety of aperture 86. In one example, internal wall 90 is angled radially inwardly from a perimeter of aperture 86.

In one embodiment, each of base 40 and cover 42 is formed by injection molding plastic (e.g., polycarbonate, polystyrene, polyvinyl chloride (PVC), acrylonitrile butadiene styrene (ABS), polyethylene terephthalate (PET), teslin, polyactide (PLA) or acrylic) or other suitable material to define the various attributes of base 40 and cover 42. In one example, the material used to form one or more of base 40 and cover 42 of housing 12 is substantially opaque to limit the amount of light emitted from electrical assembly 14 that passes through base 40 and/or cover 42 except where aperture 86 is positioned. Other methods of forming base 40 and cover 42 are also contemplated.

Figure 1:
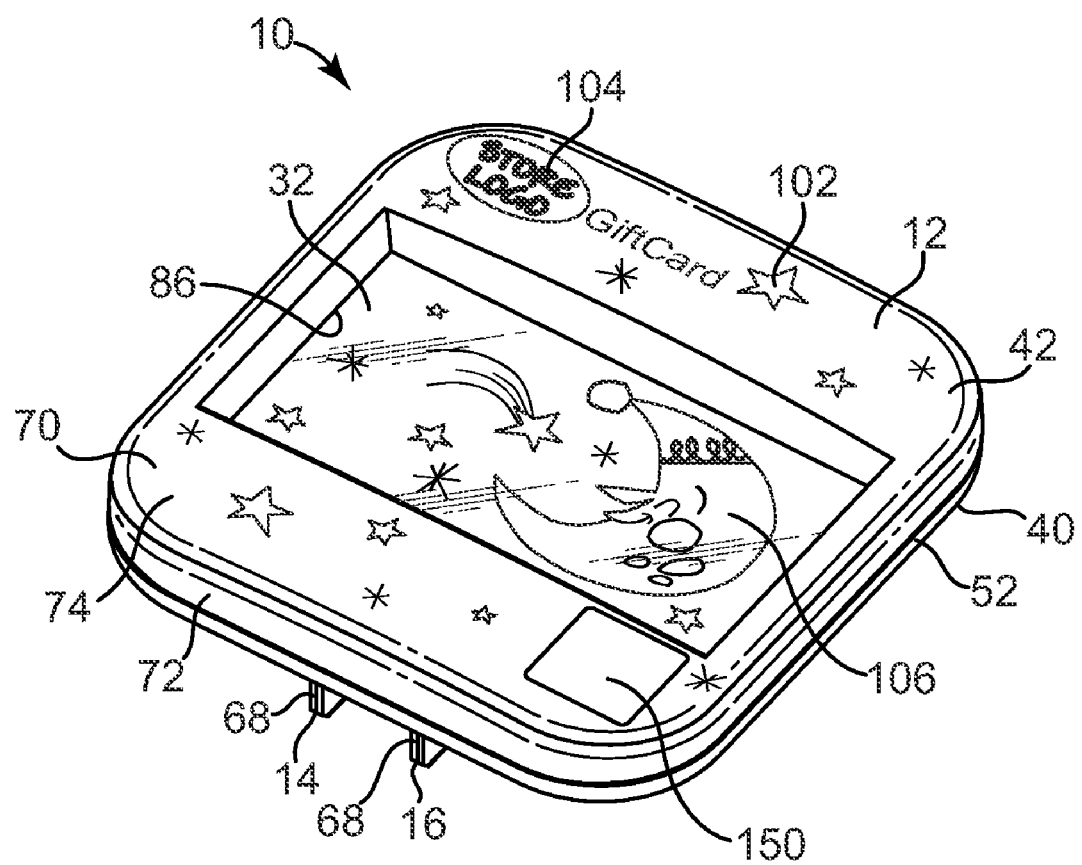
FIG. 1 is a perspective view illustration of a transaction product, according to one embodiment of the present invention.
Figure 2:
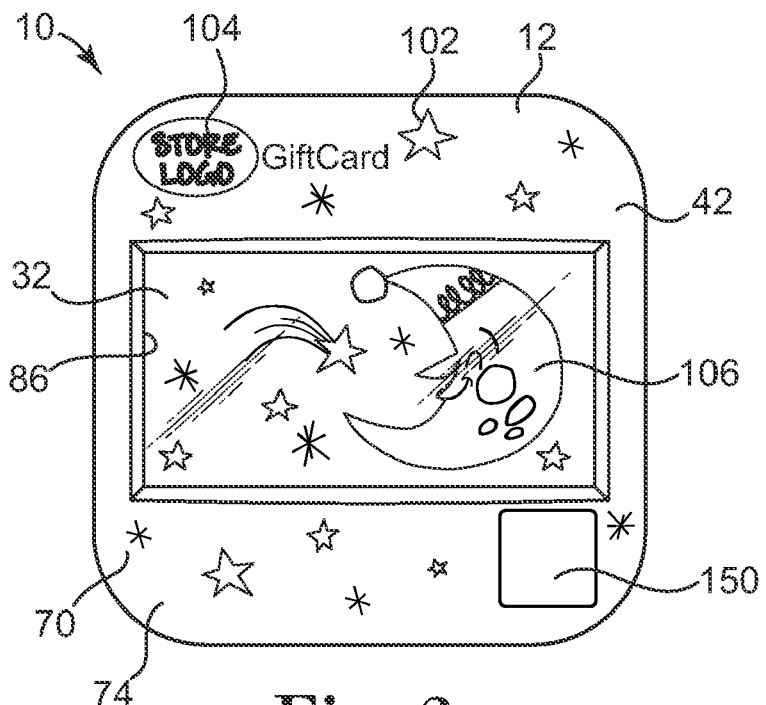
FIG. 2 is a front view illustration of the transaction product of FIG. 1, according to one embodiment of the present invention.
Figure 3:
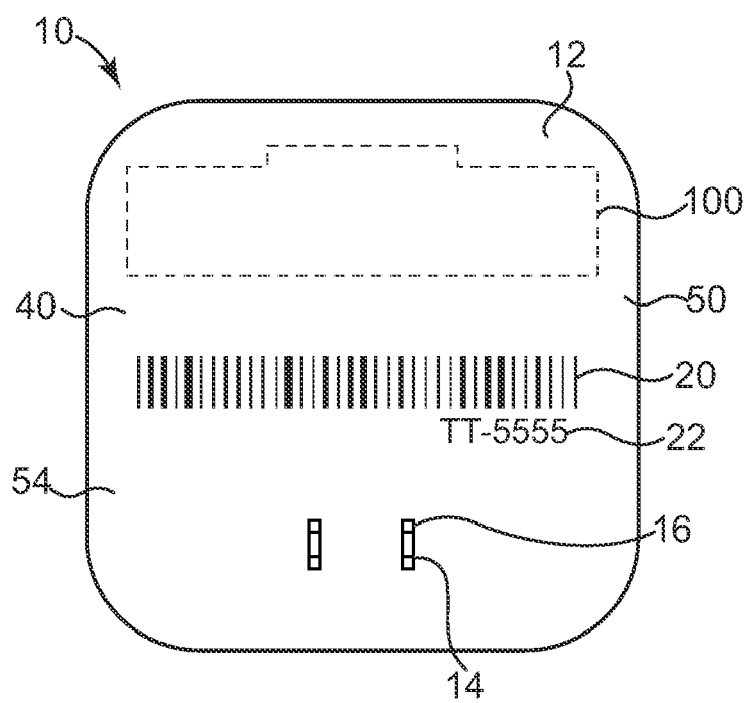
FIG. 3 is a rear view illustration of the transaction product of FIG. 1, according to one embodiment of the present invention.
Figure 4:
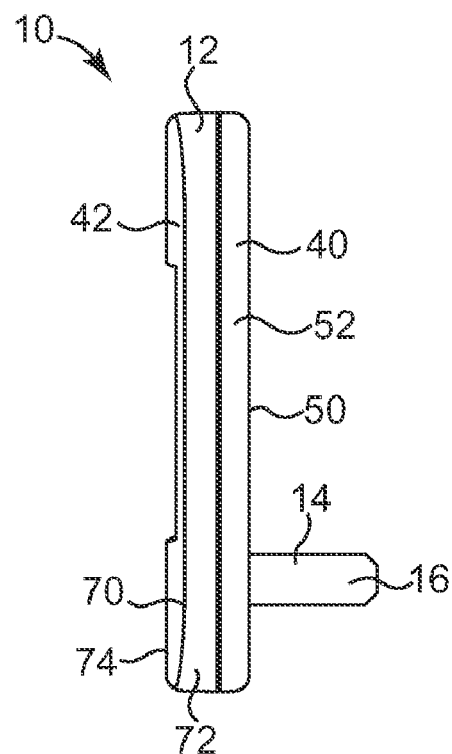
FIG. 4 is a right side view illustration of the transaction product of FIG. 1, according to one embodiment of the present invention, wherein the left side view is a mirror image thereof.
Figure 5:
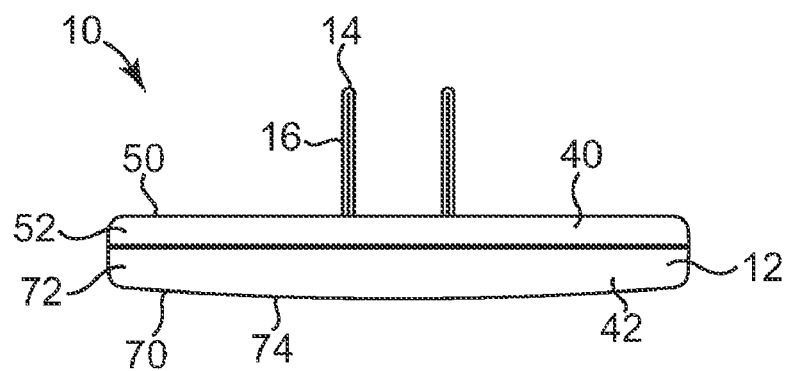
FIG. 5 is a top view illustration of the transaction product of FIG. 1, according to one embodiment of the present invention, wherein the bottom view is a mirror image thereof.

In one embodiment, redemption indicia 100, which are generally indicated with a dashed line box in FIG. 3, are included on transaction product 10, for example, on one or both of outside surface 54 of base 40 and outside surface 74 of cover 42. Redemption indicia 100 indicate that transaction product 10 is redeemable for the purchase of goods and/or services and that, upon use, a value of the purchased goods and/or services will be deducted from the financial account or record linked to transaction product 10. In one embodiment, redemption indicia 100 include phrases such as "<NAME OF STORE> GiftCard" and "This GiftCard is redeemable for merchandise or services at any of our stores or at our web site," and/or provides help or phone line information in case of a lost, stolen or damaged stored-value card, etc. In one embodiment, in which housing 12 is formed by injection molding, account identifier 20, redemption indicia 100 and one or more of any other indicia or information on transaction product 10 are printed on outside surface 54 or outside surface 74 of housing 12.

Other indicia, for example, decorative indicia 102 and/or brand indicia 104 may also be included on housing 12, for instance, on outside surface 54 and/or outside surface 74. Decorative indicia 102 are any suitable indicia configured to increase the aesthetic appeal of transaction product 10 and/or to otherwise promote transaction product 10 for a particular purpose, holiday, event, etc. Brand indicia 104 identify a store, brand, department, etc. and/or services associated with transaction product 10. Additional information/indicia besides that specifically described and illustrated herein may also be included on transaction product 10.

In one example, window 32 is sized and shaped to substantially cover (i.e., to extend over/under) aperture 86 defined by cover 42. As such, window 32 is sized at least slightly larger than aperture 86. In one embodiment, window 32 is formed of a transparent or translucent material (e.g., clear acetate) and, in one example, is printed or otherwise formed to include indicia 106 thereon. Indicia 106 may be translucent and/or opaque and are configured to alter the appearance of light from electrically driven device 18 as viewed from a vantage point external to housing 12 and window 32. In one example, indicia 106 correspond with decorative indicia 102 of housing 12. Window 32 is one example of means for altering the appearance of luminescence from electrically driven device 18.

Referring to FIG. 6, in one embodiment, electrical assembly 14 includes electrical plug 16 and electrically driven device 18. Electrical plug 16 is any suitable connector for interfacing with an electrical power source such as an electrical socket (not shown). In one example, electrical plug 16 is a male portion of an electrical connection and includes two flat parallel pins, blades or plug members 68 wherein one plug member 68 serves as a live pin and the other serves as a neutral pin. In one example, electrical plug 16 includes two plug members 68 that are each serve as a live pin. In one embodiment, each plug member 68 is formed of or is plated with one of brass, tin, nickel or other suitable material. In one example, each plug member 68 is formed separately from and is separately electrically coupled to electrically driven device 18. Use of electrical plugs having more than two plug members 68, for example, including a third or ground plug member, is also contemplated.

Electrically driven device 18 is any suitable device configured to be powered via electricity or electrical power received from the electrical socket (not shown) via electrical plug 16. In one embodiment, electrically driven device 18 includes one or more of a light, an audio device, etc. For example, electrically driven device 18 is a light configured to provide a low level of illumination appropriate to serve as a night light when electrically driven device 18 is suitably powered. In one embodiment, electrically driven device 18 includes an electroluminescent (EL) light in the form of a light panel or plate 110.

Light plate 110 may be formed in any suitable manner. In one embodiment, light plate 110 includes an EL display, which emits light in response to an electrical current being passed through it or in response to exposure to a strong electric field generally without generating a substantial amount of thermal energy. The EL display includes a luminescent phosphor layer interposed between electrodes, which form an X-Y matrix having substantially transparent front layers. When a charge is applied to the electrodes the luminescent material emits light at the intersections defined by the X-Y matrix as will be apparent to those of skill in the art upon reading the present application.

In one embodiment, the color of light emitted from light plate 110 depends upon the particular luminescent phosphor layer used. For example, for an emission of yellow light, a phosphor material of zinc sulfide (ZnS) doped with manganese (Mn) may be used. For an emission of red light, a phosphor material of calcium sulfide selenium (CaSSe) doped with europium (Eu) may be used. For an emission of green light, one of a material of zinc sulfide (ZnS) doped with terbium oxygen fluoride (TbOF) and a material of strontium sulfide (SrS) doped with cerium (Ce) may be used. For an emission of blue light, one of a material formed of strontium sulfide (SrS) doped with cerium (Ce), a material formed of strontium digallium tetrasulfide ($SrGa_2S_4$) doped with cerium (Ce), a material formed of calcium digallium tetrasulfide ($CaGa_2S_4$) doped with cerium (Ce) and a material formed of strontium sulfide (SrS) doped with copper (Cu) may be used. For an emission of white light, one of a material formed of strontium sulfide (SrS) doped with cerium (Ce) combined with a material formed of zinc sulfide (ZnS) doped with manganese (Mn) and a material formed of strontium sulfide (SrS) doped with copper (Cu) combined with a material formed of zinc sulfide (ZnS) doped with manganese (Mn) may be used. In one embodiment, a light plate 110 configured to emit yellow or white light is used in conjunction with a colored filter (e.g., as an alternative to or in addition to window 32) to achieve a desired color for emission of light from transaction product 10. The above-described elements along with insulators and/or other components are layered on one another and positioned on one or more substrates such that a solid-state device is formed, for example, in the form of light plate 110, as will be apparent to those of skill in the art upon reading the present application. In view of the above, light plate 110 is one example of means for providing luminescence from an electroluminescent display.

Figure 9:
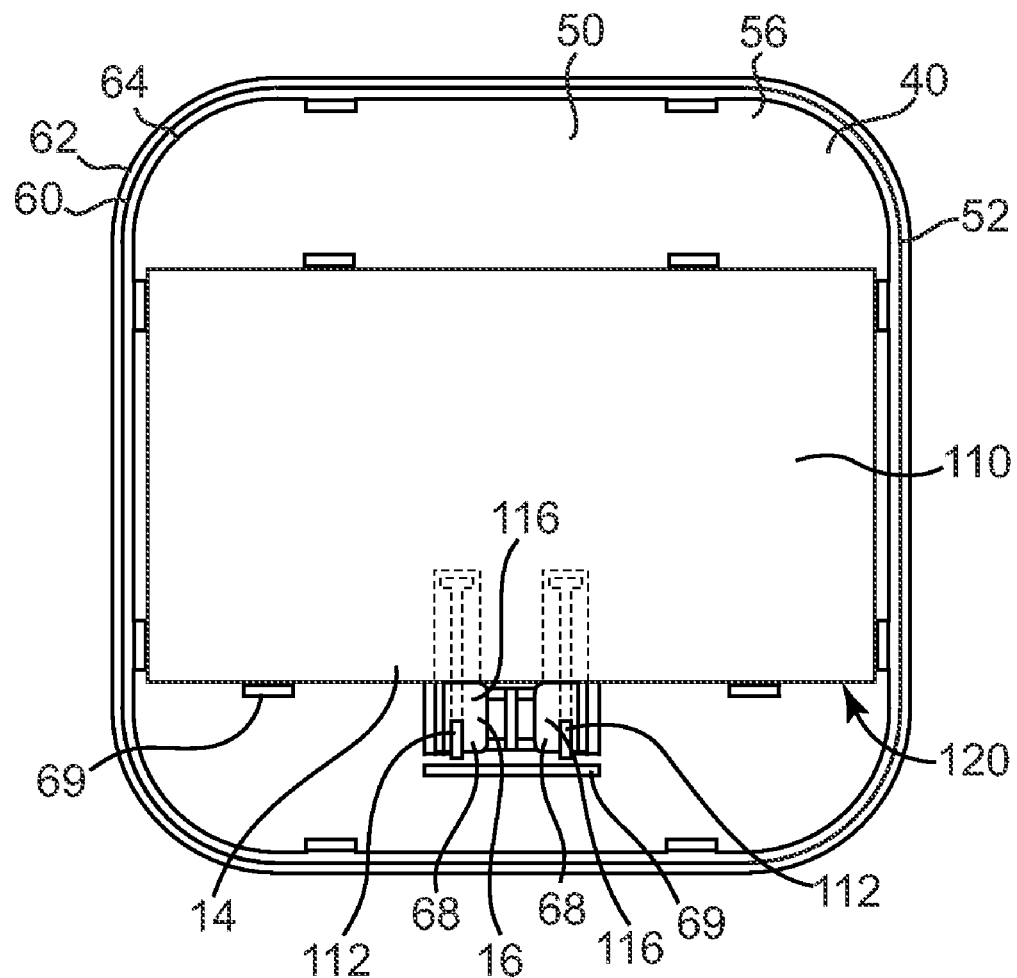
FIG. 9 is a front view illustration of a base, a light panel and plug members of the transaction product of FIG. 6, according to one embodiment of the present invention.

In one embodiment, electrical contacts 112, for example, two electrical contacts 112, extend from light plate 110 and are configured to power electrodes of light plate 110, which thereby causes illumination of light plate 110. In one embodiment, each electrical contact 112 (e.g., electrically conductive wire) extends from light plate 110 and wraps around or otherwise interacts with one of plug members 68. For example, referring to FIG. 6, in one embodiment, each plug member 68 is substantially L-shaped or otherwise defines a main portion 114 and a lip or flange 116 extending transversely from main portion 114, which is substantially planar. One of electrical contacts 112 wraps around the respective flange 116 as generally illustrated with reference to FIG. 9 such that electrical power can be transferred from the respective plug member 68 through electrical contact 112 and to light plate 110. In other embodiments, electrically driven device 18 may be a light configured to be illuminated due to heat (e.g., incandescence) and/or due to the interaction of chemicals (e.g., chemoluminescence), an audio recording and/or playback device, etc. configured to be powered via electrical plug 16 as will become clear to those of skill in the art upon reading the present application. As described above, electrical plug 16 is one example, of means for powering electrically driven device 18.

During assembly of electrical assembly 14, light plate 110 is electrically coupled with each plug member 68. More specifically, in one example, electrical contacts 112, which extend from light plate 110, are each positioned to contact and, in one embodiment, to wrap around a portion of each plug member 68 such as flange 116 of each plug member 68. Once assembled to one another, electrical power received via electrical plug 16 from a corresponding electrical socket (not shown) is transferred to light plate 110 via electrical contacts 112. As such, electrical assembly 14 including light plate 110, plug members 68 and electrical contacts 112 is formed.

Once assembled, electrical assembly 14 is positioned within housing 12. For example, electrical assembly 14 is positioned relative to base 40 as illustrated with reference to FIGS. 6 and 9. More specifically, electrical assembly 14 is positioned such that each plug member 68 thereof is positioned to extend from electrical contacts 112 through one of apertures 66 formed in primary panel 50 of base 40. In one embodiment, base 40 includes protrusions 69 configured to facilitate positioning of plug members 68 relative to base 40 and apertures 66.

Upon placement of electrical assembly 14 relative to base 40, light plate 110 is positioned and aligned with base 40. In one example, at least a portion of the protrusions 69 of base 40 collectively define a plate reception area 120 therebetween. Light plate 110 is placed within plate reception area 120 such that the ones of protrusions 69 forming plate reception area 120 are positioned adjacent various sides of light plate 110 such that protrusions 69 generally decrease undesired movement of light plate 110 within housing 12. In one example, a cushion or pad 122 configured to absorb impact thereto is placed between light plate 110 and primary panel 50 of base 40 to cushion light plate 110 relative to housing 12. In one embodiment, pad 122 is formed of any suitable padding material and/or is sized similarly to light plate 110. As such, pad 122 is positioned within plate reception area 120 prior to positioning of light plate 110 within plate reception area 120 to cushion light plate 110 within housing 12. In one example, pad 122 is adhered to inside surface 56 of primary panel 50 of base 40 within plate reception area 120.

Figure 7:
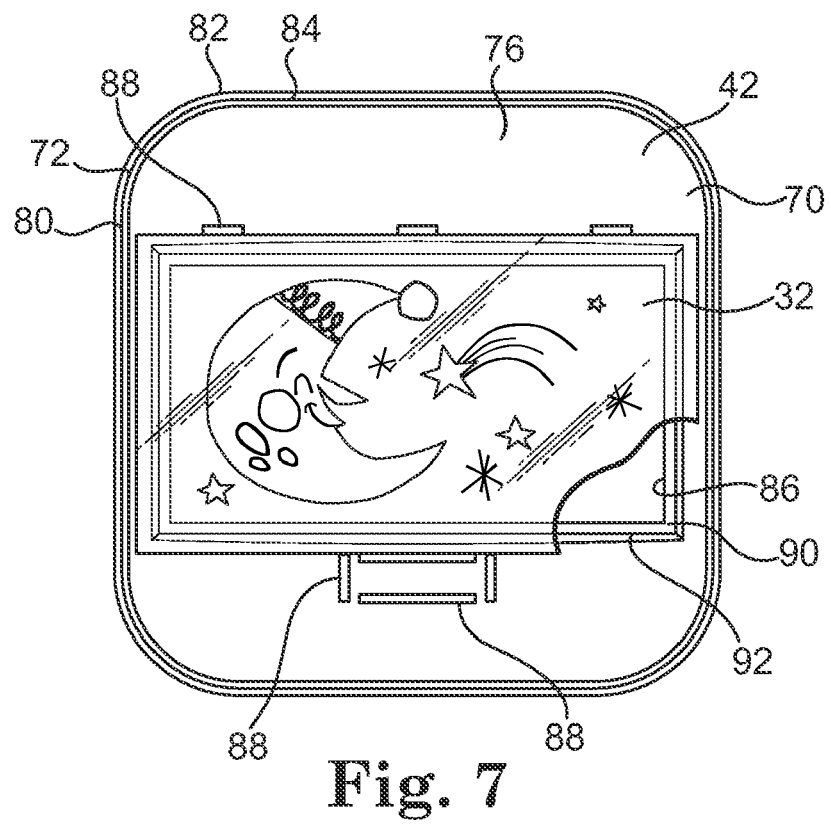
FIG. 7 is a rear view illustration of a cover and a window of the transaction product of FIG. 6, according to one embodiment of the present invention.
Figure 8:
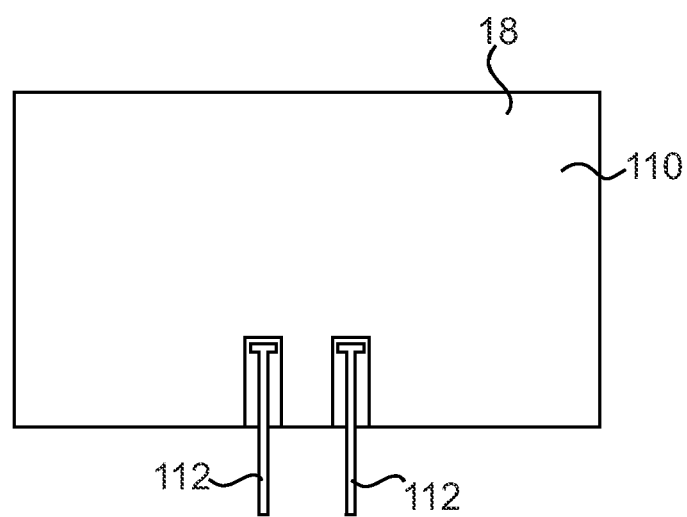
FIG. 8 is a rear view illustration of a light panel of FIG. 6, according to one embodiment of the present invention.

Window 32 is positioned over light plate 110 (e.g., opposite pad 122) to protect light plate 110 from being directly contacted through aperture 86 of housing 12. As such, window 32 is positioned within plate reception area 120, and then, cover 42 is placed over base 40 such that light plate 110 is visible through aperture 86 of cover 42 and window 32. Referring to FIG. 7, upon or prior to coupling of cover 42 to base 40, in one embodiment, window 32 and/or a portion of light plate 110 is held in place within housing 12 not only using protrusions 69 of base 40, but also due to protrusions 88 of cover 42.

More specifically, housing 12 is formed around electrical assembly 14 by placing base 40 to interface with cover 42 or vice versa. Accordingly, base 40 is placed on cover 42 such that inside edge 60 of base 40 interfaces with inside edge 80 of cover 42. More specifically, first portion 62 and second portion 64 of inside edge 60 interface with first portion 82 and second portion 84 of inside edge 80, respectively. The stepped interface provides for a stable and generally neat coupling of base 40 and cover 42. In one example, adhesive is applied between inside edge 60 and/or inside edge 80 to secure base 40 to cover 42 and/or cover 42 is ultrasonically welded or otherwise coupled with base 40 along inside edges 60 and 80. Other methods of securing base 40 to cover 42 are also contemplated.

Upon final assembly, transaction product 10 functions both in a transactional manner and to provide illumination, in the case of light electrically driven device 18, or with other electrically provided functionality or amusement. This at least dual functionality of transaction product 10 serves to entice consumers to purchase transaction product 10. In one example, transaction product 10 additionally includes an on/off or power switch (not shown) configured to turn on and off electrically driven device 18 such that the device is not automatically turned on or off based on whether electrical plug 16 is or is not currently interfacing with a power supplying socket.

In one embodiment, in addition or as an alternative to the on/off power switch, transaction product 10 may include a photoelectric eye or light sensor 150 electrically coupled with electrical assembly 14 and configured to turn on and off electrically driven device 18 based on an amount of environmental light detected by light sensor 150. For instance, electrical assembly 14 will turn on electrically driven device 18 when the amount of light detected by light sensor 150 falls below a predetermined level and will turn off electrically driven device 18 when the amount of light detected by light sensor 150 rises above the predetermined level. Other variations of transaction product 10 will be apparent to those of skill in the art upon reading the present application.

Figure 10:
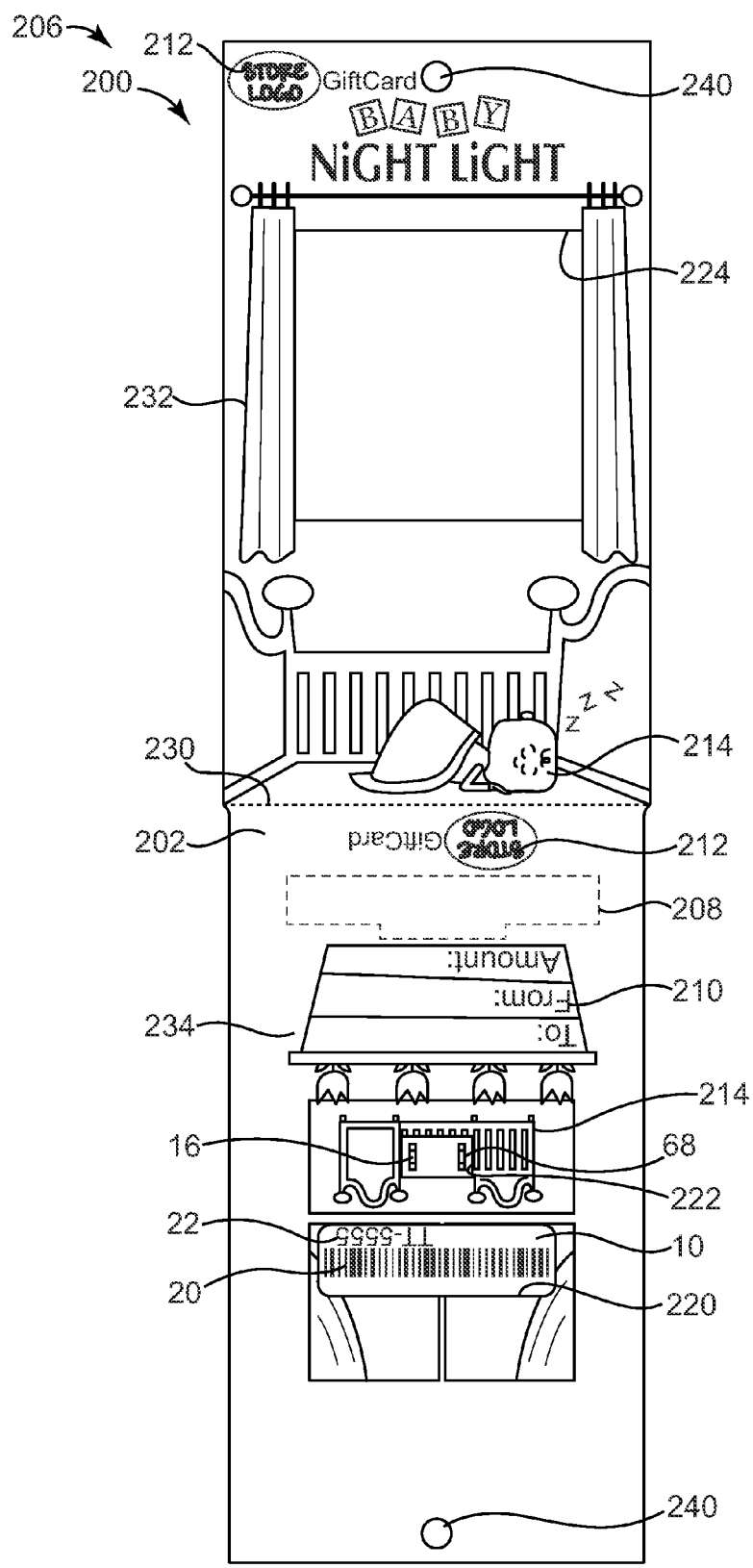
FIG. 10 is a front view illustration of a transaction product assembly including a backer and the transaction product of FIG. 1, according to one embodiment of the present invention.

FIG. 10 illustrates a carrier or backer 200 supporting transaction product 10. Backer 200 comprises a single layer or multiple layers of paper or plastic material, for example, generally in the form of a relatively stiff but bendable/flexible card. Use of other materials is also contemplated. As such, backer 200 defines an exterior surface 202 (FIG. 10) and an interior surface 204 (FIG. 11) positioned opposite exterior surface 202. Transaction product 10 is readily releasably attached to backer 200, for example, by adhesive, blister packaging, clam shell packaging, overlying skinning material or the like, such that transaction product 10 and backer 200 collectively define a transaction product assembly 206, as will be further described below.

In one embodiment, backer 200 includes a window or opening 220 for displaying account identifier 20 of transaction product 10 as illustrated in FIG. 10. As previously described, account identifier 20 is adapted for accessing an account or record associated with transaction product 10 for activating, loading or debiting value from the account or record. Accordingly, in one embodiment, opening 220 allows access to account identifier 20 to activate and/or load transaction product 10 without removing transaction product 10 from backer 200.

In one embodiment, backer 200 additionally defines an opening or hole 222 for electrical plug 16 to extend through when transaction product 10 is coupled with backer 200 and/or an opening or aperture 224 (e.g., as generally outlined by a depicted window and curtain in FIG. 10) sized to allow housing 12 or at least a portion thereof extend therethrough when backer 200 is folded. More specifically, in one embodiment, backer 200 includes a fold line 230 dividing backer 200 into a front panel 232 and a rear panel 234.

Figure 11:
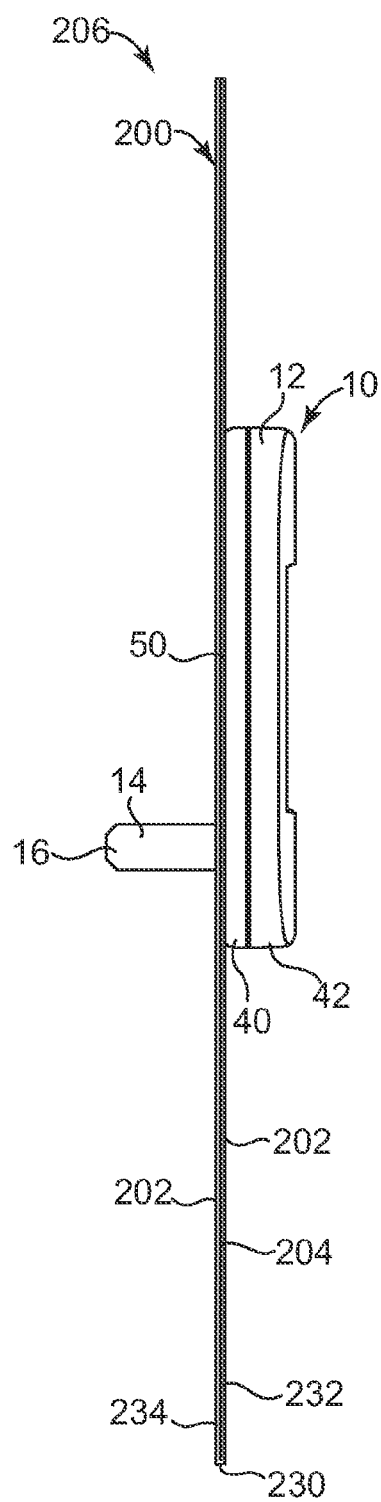
FIG. 11 is a side view illustration of the transaction product assembly of FIG. 10, according to one embodiment of the present invention.

Additionally referring to the fully assembled and folded backer 200 illustrated in FIG. 11, in one embodiment, transaction product 10 is coupled with interior surface 204 of rear panel 234 such that account identifier 20 aligns with opening 220 and electrical plug 16 extends out hole 222, which is defined by rear panel 234. Subsequently, backer 200 is folded about fold line 230 in a manner moving a portion of interior surface 204 defined by front panel 232 toward and eventually into contact with a portion of interior surface 204 defined by rear panel 234. The portion of interior surface 204 defined by front panel 232 is, more particularly, coupled directly to the portion of interior surface 204 defined by rear panel 234. Upon folding, in one embodiment, at least a substantial portion of housing 12 extends through aperture 224 of front panel 232. Accordingly, backer 200 as described allows for viewing of nearly all of transaction product 10 except for portions of outside surface 54 of primary panel 50.

In one embodiment, backer 200 defines a hanging aperture 240 configured to receive a support arm or hook, such that transaction product assembly 206 can be hung from a rail or rack within the retail setting or elsewhere to facilitate display of transaction product assembly 206. Other backers, such as foldable backers (not shown) or non-hanging backers, can be used with various sizes and shapes of transaction products 10.

In one embodiment, backer 200 displays indicia, graphics or text information including store logo(s), store name(s), slogans, advertising, instructions, directions, brand indicia, promotional information, holiday indicia, seasonal indicia, media format identifiers, characters and/or other information. The various indicia may be included on one or more of exterior surface 202 and internal surface 204. In one example, the indicia include one or more of redemption indicia 208, message field indicia 210, brand indicia 212, decorative indicia 214, etc.

Redemption indicia 208, which are generally indicated with a dashed line box in FIG. 10, inform a bearer of transaction product assembly 206 that transaction product 10 is redeemable for the purchase of goods and/or services and that upon use, a value of the purchased goods and/or services will be deducted from the financial account or record linked to transaction product 10. In one embodiment, redemption indicia 208 include phrases such as "<NAME OF STORE> GiftCard" and "This GiftCard is redeemable for merchandise or services at any of our stores or at our website," and/or provides help or phone line information in case of a lost, stolen or damaged transaction product 10, etc.

Message field indicia 210, for example, include "to," "from" and "amount" fields and are configured to be written to by the bearer of transaction product assembly 206 prior to presenting transaction product assembly 206 to a recipient. As such, message field indicia 210 facilitate the consumer in preparing transaction product assembly 206 for gifting to a recipient.

Brand indicia 212 identify a store, brand, department, etc. and/or services associated with transaction product 10. Any decorative indicia 214, which may be similar to or coordinate with indicia of transaction product 10, may also be included on backer 200. Any of indicia 208, 210, 212, 214 or other indicia optionally may appear anywhere on backer 200 or transaction product 10. In one embodiment, at least one of indicia 208, 210, 212, 214 or other indicia include stylized text further contributing to the aesthetics of transaction product assembly 206 as illustrated, for example, in FIG. 10. Additional information besides that specifically described and illustrated herein may also be included.

Figure 12:
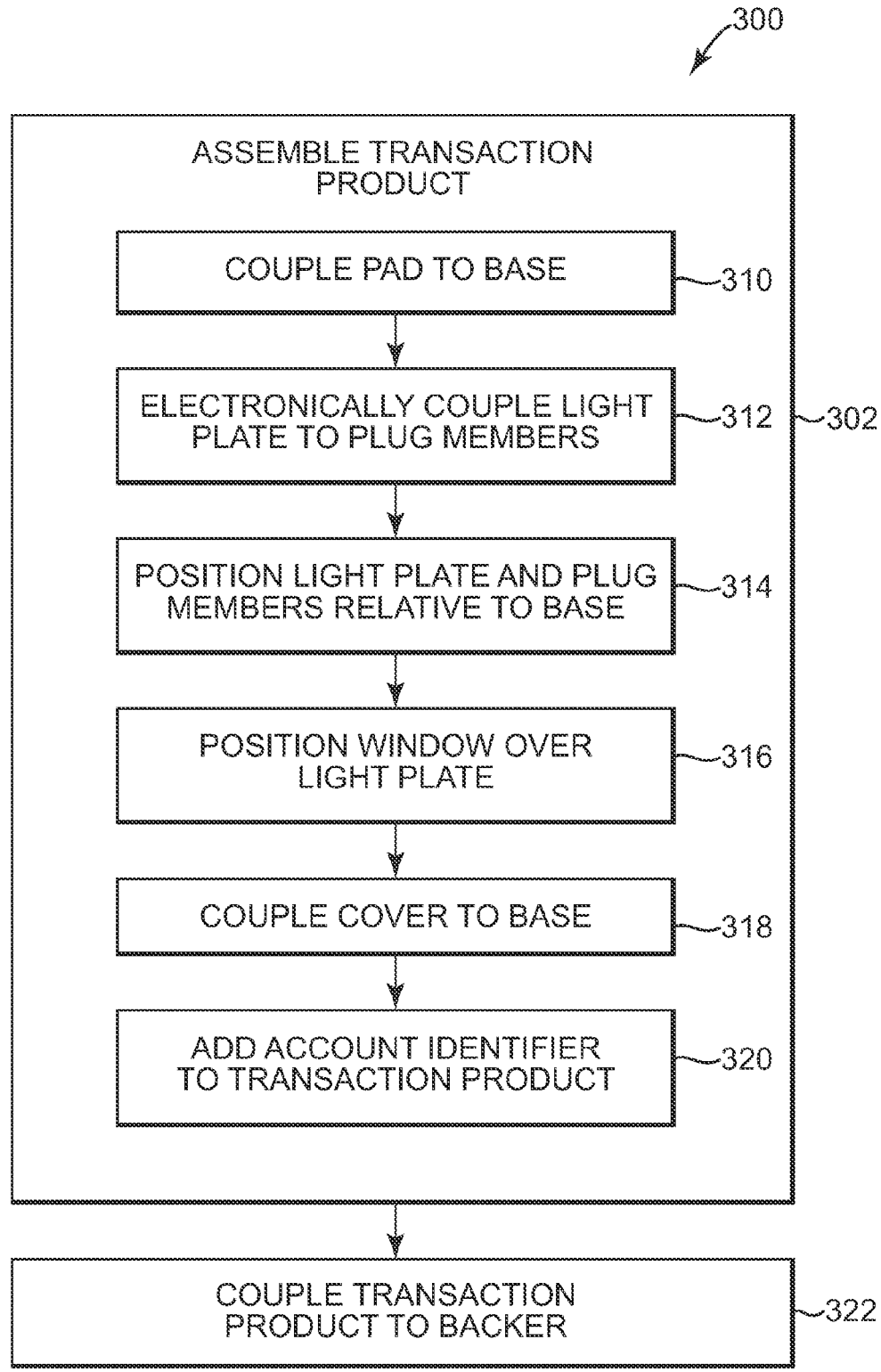
FIG. 12 is a flow chart illustrating a method of assembling the transaction product, according to one embodiment of the present invention.

FIG. 12 is a flow chart illustrating one embodiment of a method 300 of assembling transaction product 10. For example, at 310, pad 122 is placed on and, in one embodiment, is coupled to base 40, more specifically, within plate reception area 120, with adhesive or in any other suitable manner. Then, at 312, light plate 110 is electrically coupled with plug members 68 of electrical plug 16. In one embodiment, light plate 110 is electrically coupled with plug members 68 via electrical contacts 12 that extend between and, in one example, are wrapped around at least plug members 68 to assemble electrical assembly 14.

At 314, electrical assembly 14 is positioned relative to base 40. In particular, light plate 110 is placed on pad 122 opposite primary panel 50 of base 40, and each plug member 68 is positioned to extend from an interior portion of base 40 through a corresponding one of apertures 66 defined by base 40 to allow plug members 68 to be accessed even when housing 12 is fully assembled around a remainder of electrical assembly 14. Although primarily described herein as statically extending from base 40, in one embodiment, plug members 68 may be movably coupled with base 40. For example, in one embodiment, plug members 68 are configured to fold at least partially into base 40 during periods of storage or non-use and are configured to fold out or to otherwise extend away from base 40 during periods of use as will be apparent to one of skill in the art upon reading this application. In one embodiment, window 32 or other filter, diffuser, etc. is placed over light plate 110 opposite pad 122. In one example, each of pad 122, light plate 110 and window 32 is similarly sized and shaped such that each of pad 122, light plate 110 and window 32 generally fit within plate reception area 120 and are at least partially maintained therein by base protrusions 69.

At 318, base 40 and cover 42 are coupled to one another. In one instance, inside edge 60 of base 40 is positioned to abut and be secured to inside edge 80 of cover 42 as described above. Upon coupling base 40 and cover 42 to one another, aperture 86 of cover 42 is aligned with window 32 and light plate 110 such that light plate 110 is at least partially visible through window 32 and aperture 86. In one example, aperture 86 is sized similarly to, but slightly smaller than window 32 and light plate 110. In this manner, light from light plate 110 passes through window 32, and therefore, through and/or around indicia 106 of window 32 to escape housing 12.

In one embodiment, given the slight biasing and resiliency of pad 122, pad 122 slightly pushes light plate 110 toward window 32 and, in turn, pushes window 32 toward cover 40. As such, window 32 interfaces with edge 92 of internal wall 90, which extends around aperture 86, in a manner substantially sealing aperture 86 of housing 12 to decrease an amount of undesired contaminants that may otherwise enter housing 12 through aperture 86. Other methods of coupling base 40 and cover 42 are also contemplated and/or one or more of base 40 and cover 42 or similar members are used to fully support electrical assembly 14 without substantially enclosing electrical assembly 14 therein.

At 320, account identifier 20 is added to housing 12, if account identifier is not already part of transaction product 10. Although illustrated in FIG. 12 as occurring after all of operations 310, 312, 314, 316 and 318, it should be understood that account identifier 20 may be applied to housing 12 or any portion thereof at any suitable time during manufacturing and assembly thereof. For example, account identifier 20 may be molded into or otherwise integrally formed as part of housing 12, may be enclosed within housing 12 and/or may be printed or otherwise applied to housing 12 before or after one or more of operations 310, 312, 314, 316 and 318 as will be apparent to those of skill in the art upon reading this application.

At 322, transaction product 10 is coupled with backer 200 as generally illustrated with additional reference to FIGS. 10 and 11 to form transaction product assembly 206. As described above, transaction product 10 may be adhered, skinned to, blister packed with or otherwise suitably coupled with backer 200. In one embodiment, account identifier 20 of transaction product 10 is accessible for scanning while transaction product 10 is coupled with backer 200, for example, through opening 220 in backer 200.

Figure 13:
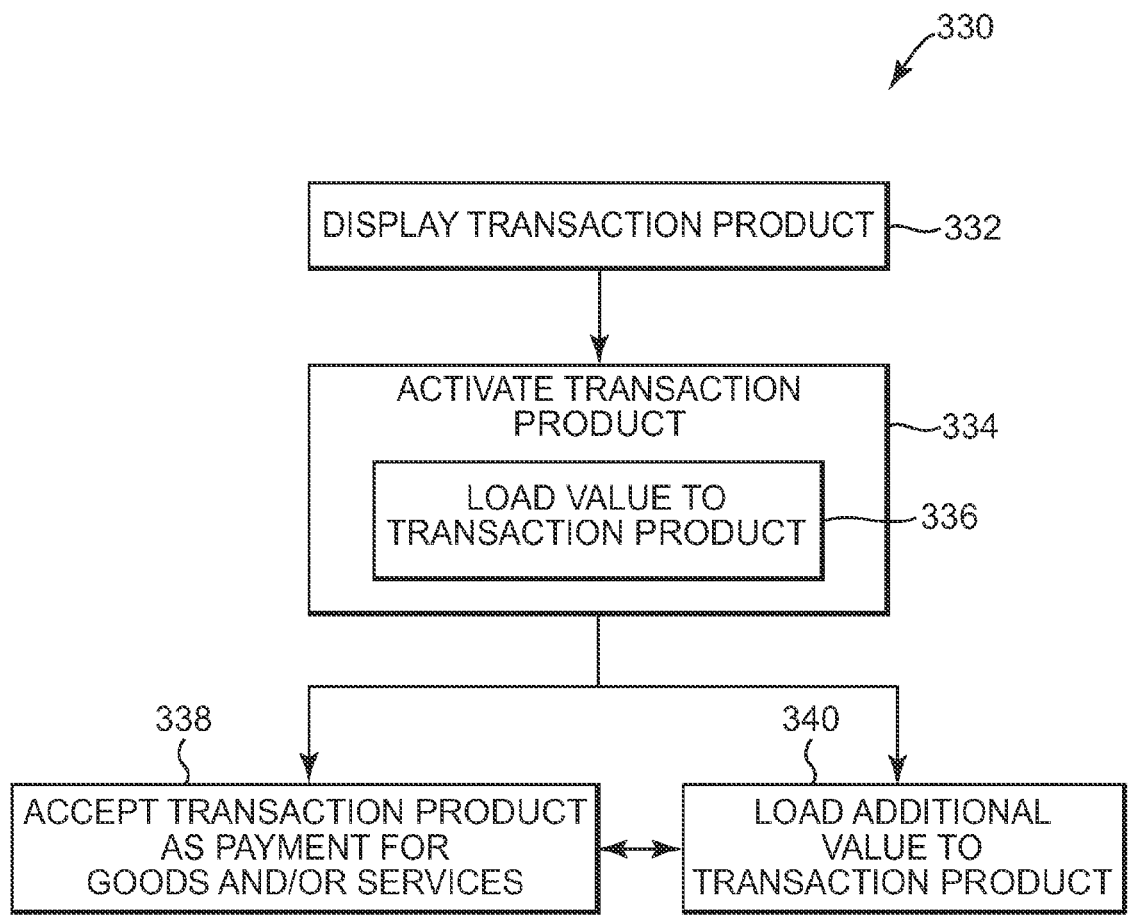
FIG. 13 is a flow chart illustrating a method of encouraging purchase and facilitating use of a transaction product, according to one embodiment of the present invention.

FIG. 13 is a flow chart illustrating one embodiment of a method 330 of encouraging purchase and facilitating use of transaction product 10 by consumers and/or recipients. At 332, transaction product 10 is placed on or hung from a rack, shelf or other similar device to display transaction product 10 for sale to potential consumers. In one embodiment, a depiction of transaction product 10 is placed on a web site for viewing and purchase by potential consumers. In one example, display of transaction product 10 includes advertising the electrical functionality of transaction product 10 to encourage consumer purchase of transaction product 10, for example, in the form of indicia 208, 210, 212, 214, etc.

At 334, a consumer who has decided to purchase transaction product 10 presents transaction product 10 on backer 200 to a retail store employee, retail store kiosk, remote terminal or other person or device to scan account identifier 20 to access an account or record linked to account identifier 20. In particular, account identifier 20 is scanned or otherwise accessed, for example through opening 220 of backer 200 to activate transaction product 10. Upon accessing the account or record, then, at 336, value is added to the account or record in the form of monetary value, points, minutes, etc. Thus, transaction product 10 is activated and loaded.

In one example, a predetermined value is associated with transaction product 10 (i.e., associated with the account or record linked to transaction product 10 via account identifier 20) prior to activation and display, but such predetermined value is not initially available for use toward the purchase or use of goods and/or services. In such an embodiment, at 334, transaction product 10 is activated to permit subsequent access to the predetermined value (e.g., subsequent loading on and debiting from the account or record) and no additional value is added during activation such that operation 336 may be eliminated.

Once transaction product 10 is activated and loaded, transaction product 10 can be used by the consumer or any other bearer of transaction product 10 to purchase goods and/or services at the affiliated retail setting (e.g., a retail store or web site) or can be used in exchange for calling minutes, etc. In one embodiment, where transaction product 10 is displayed on a web site at 332, then, at 334, transaction product 10 may be activated in any suitable method and may not require the physical scanning of account identifier 20 to be activated or to otherwise access the associated account or record such as at 336.

In one example, at 338, the retail store or other affiliated retail setting or web site accepts transaction product 10 as payment toward the purchase of goods and/or services made by the current bearer of transaction product 10. In particular, the value currently loaded on transaction product 10 (i.e., stored or recorded in the account or record linked to account identifier 20) is applied toward the purchase of goods and/or services. At 340, additional value is optionally loaded on transaction product 10 at a point-of-sale terminal, kiosk or other area of the retail store, retail web site, or other related setting. Upon accepting transaction product 10 as payment at 338, the retail store or related setting can subsequently perform either operation 338 again or operation 340 as requested by a current bearer of transaction product 10. Similarly, upon loading additional value on transaction product 10 at 340, the retail store or related setting can subsequently perform either operation 340 again or operation 338. In one example, the ability to accept transaction product 10 as payment for goods and/or services is limited by whether the account or record associated with transaction product 10 has any value stored or recorded therein at the time of attempted redemption.

Figure 14:
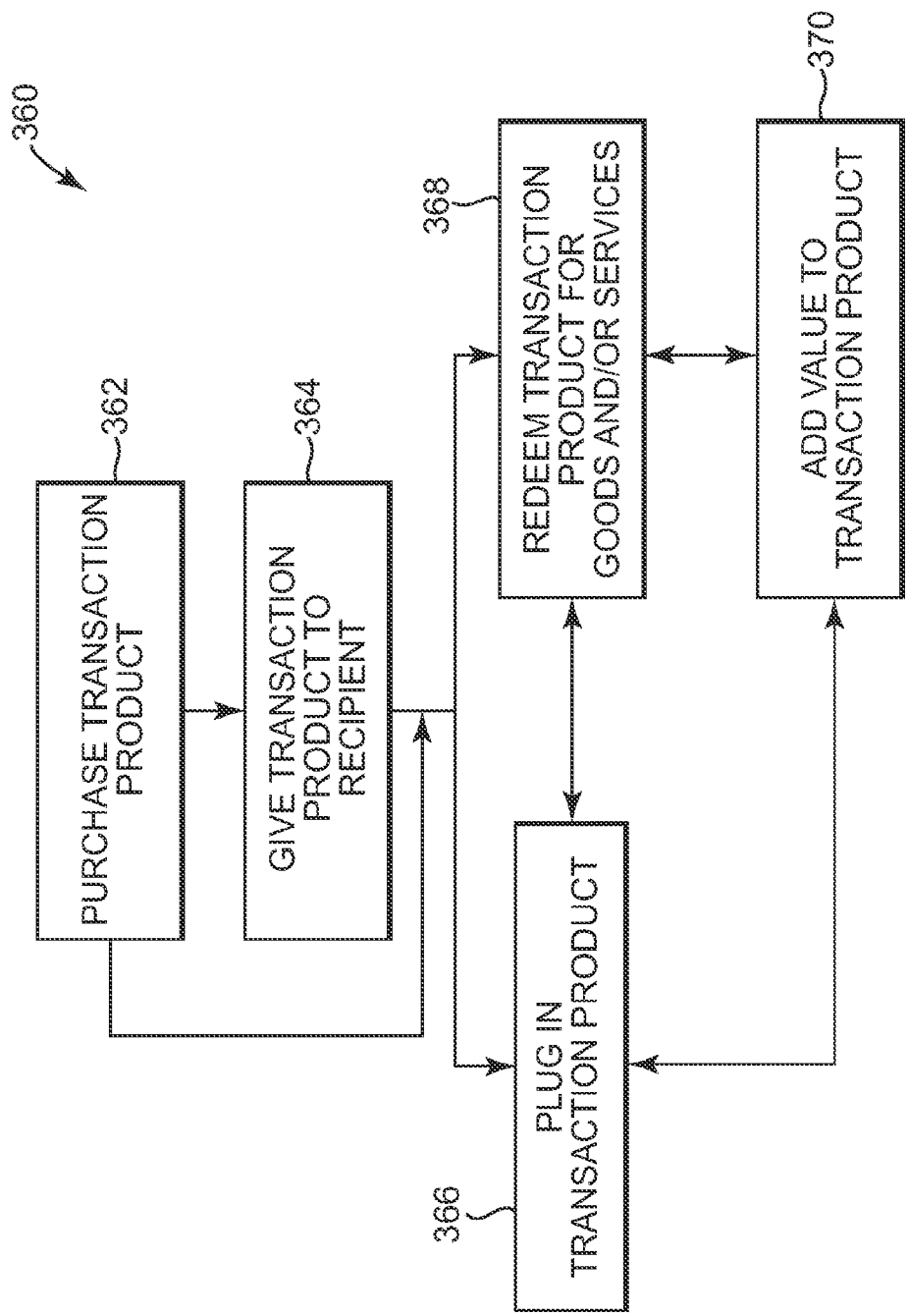
FIG. 14 is a flow chart illustrating a method of using a transaction product, according to one embodiment of the present invention.

FIG. 14 is a flow chart illustrating one embodiment of a method 360 of using transaction product 10 (e.g., FIGS. 1-6). At 362, a potential consumer of transaction product 10, which is displayed in a retail store or viewed on a web site, decides to and does purchase transaction product 10 from the retail store or web site. It should be understood that transaction product 10 can be displayed and purchased alone or as part of transaction product assembly 206.

Upon purchasing transaction product 10, a retail store employee, a retail store kiosk or other person or device scans account identifier 20 (FIG. 3), for example, through opening 220 of backer 200 or otherwise reads or accesses account identifier 20. Upon accessing account identifier 20, the account or record linked to account identifier 20 is accessed and activated to load value onto transaction product 10 (i.e., to load value to the account or record associated with transaction product 10). In one embodiment, such as where transaction product 10 is purchased at 362 via a web site, actual scanning or other mechanical detection of account identifier 20 may be eliminated and/or manual input of code 22 may be added.

At 364, the consumer optionally gives transaction product 10 to a recipient, such as a graduate, relative, friend, expectant parents, one having a recent or impending birthday, a couple having a recent or impending anniversary, etc. In one embodiment, a plurality of transaction products 10 are purchased and given to party goers such as at a birthday party, etc. as party favors or gifts. As an alternative, the consumer can keep transaction product 10 for his or her own use thereby eliminating operation 364.

At 366, the consumer, recipient or other current bearer of transaction product 10 interacts with transaction product 10 to use transaction product 10 in its non-transactional capacity. For example, electrical plug 16 of transaction product 10 is placed into an electrical socket and, consequently, electrically driven device 18 is activated to illuminate, play or record an audio message, etc. In one embodiment, upon placement of electrical plug 16 into an electrical socket, electrical power is transferred from the electrical socket to the light plate 110, which, in turn, illuminates light plate 110 such that transaction product 10 functions as a light (e.g., a night light).

At 368, the consumer or recipient redeems transaction product 10 for goods and/or services from the retail store or web site. At 370, the consumer or recipient of transaction product 10 optionally adds value to transaction product 10, more particularly, to the account or record associated with account identifier 20 included therewith, at the retail store or over the Internet (i.e., via the web site). Upon plugging in transaction product 10 at 366, redeeming transaction product 10 at 368 or adding value to transaction product 10 at 370, the consumer or recipient of transaction product 10 subsequently can perform either of operations 366, 368 or 370 as desired. In one embodiment, the ability of the consumer or recipient to repeat redeeming transaction product 10 at 370 is limited by whether the account or record linked with transaction product 10 has any remaining value stored or recorded therein at the time of attempted redemption.

Although primarily described above as occurring at a single retail store or web site, in one embodiment, purchasing transaction product 10 at 362, redeeming transaction product 10 at 368 and adding value to transaction product 10 at 370, can each be performed at any one of a number of stores adapted to accept transaction product 10 or over the Internet. In one example, each of the number of stores is part of a chain or a group of similarly branded stores. In one example, a number of stores include at least one web site and/or at least one conventional brick and mortar store.

Transaction products come in many forms, according to embodiments of the invention. The gift card, like other transaction products, can be "re-charged" or "re-loaded" at the direction of the original consumer, the gift recipient or a third party. The term "loading on" or "loaded on" herein should be interpreted to include adding to the balance of an account or record associated with a transaction product. The balance associated with the transaction product declines as the transaction product is used, encouraging repeat visits or use. The transaction product remains in the user's purse or wallet, serving as an advertisement or a reminder to revisit the associated merchant. Gift cards according to embodiments of the invention provide a number of advantages to both the consumer and the merchant. Other transaction products according to embodiments of the invention include loyalty cards, merchandise return cards, electronic gift certificates, calling cards, employee cards, frequency cards, prepaid cards and other types of cards associated with or representing purchasing power, monetary value, etc.

Although the invention has been described with respect to particular embodiments, such embodiments are for illustrative purposes only and should not be considered to limit the invention. Various alternatives and other modifications within the scope of the invention in its various embodiments will be apparent to those of ordinary skill in the art upon reading this application.

What is claimed is:

1. A transaction product configured to interface with and receive electrical power from an electrical socket, the transaction product comprising:
   a support member;
   an electrical circuit coupled to the support member, the electrical circuit including an electrical plug and an electrically driven device electrically coupled with the electrical plug, wherein the electrical plug includes at least two blades extending from the support member, and the at least two blades are configured to interface with the electrical socket such that electrical power from the electrical socket is transferred to the electrically driven device via the electrical plug; and
   means for linking the transaction product to an account or a record, wherein the means for linking is machine readable.

2. The transaction product of claim 1, wherein the means for linking is a bar code connected to the support member.

3. The transaction product of claim 1, wherein the means for linking includes at least one of a bar code, a magnetic strip, a smart chip and a radio frequency identification (RFID) device.

4. The transaction product of claim 1, wherein the support member defines at least two apertures, each of the at least two blades extends out of the base through a different corresponding one of the at least two apertures, and each of the at least two blades extends parallel to an extension of the other of the at least two blades.

5. The transaction product of claim 1, wherein one of the at least two blades is live and one of the at least two blades is neutral.

6. The transaction product of claim 1, wherein the electrically driven device includes an electroluminescent (EL) light plate.

7. The transaction product of claim 1, wherein the electrically driven device includes a light.

8. The transaction product of claim 7, wherein the support member is a housing, which substantially encloses the electrical circuit other than the electrical plug, and the housing defines an aperture aligned with the light to allow illumination from the light to escape the housing via the aperture.

9. The transaction product of claim 8, further comprising a window covering the aperture and extending between the aperture and the light, the window being substantially one of translucent and transparent.

10. The transaction product of claim 8, wherein the housing includes a base and a cover, the base defines openings through which the at least two blades of the electrical plug extend from the housing, and the cover defines the aperture aligned with the light.

11. The transaction product of claim 10, wherein the base defines a first primary panel, the cover defines a second primary panel spaced from the first primary panel, and the housing includes a side wall extending around and between perimeters of the first primary panel and the second primary panel.

12. The transaction product of claim 1, further comprising a pad coupled to the support member, wherein the electrically driven device is positioned on the pad opposite the support member such that the pad cushions the coupling of the electrically driven device to the support member.

13. The transaction product of claim 1, wherein the support member includes a primary panel and a plurality of protrusions extending therefrom to define a reception area for receiving the electrically driven device.

14. The transaction product of claim 1, in combination with a carrier releasably coupled to the support member.

15. The combination of claim 14, wherein the carrier is substantially planar and the electrical plug extends through a hole in the carrier.

16. A light product comprising:
   a housing defining an aperture;
   means for providing luminescence from an electroluminescent display through the aperture of the housing;
   means for powering the electroluminescent display such that the electroluminescent display is able to provide luminescence; and
   means for linking the housing with at least one of an account and a record having a value associated therewith such that the light product can be used as payment toward a purchase of one or more of goods and services.

17. The light product of claim 16, wherein the means for powering the electroluminescent display extends out of the housing and is configured to interact with a power source external to the light product.

18. The light product of claim 17, wherein the means for powering is configured to be repeatedly coupled and uncoupled with the power source.

19. The light product of claim 16, further comprising means for altering an appearance of luminescence from the electroluminescent display as the luminescence is viewed from a vantage point external to the housing.

20. The light product of claim 16, wherein the electroluminescent display is substantially planar.

21. A method of encouraging purchase and facilitating use of a stored-value card linked to a record or account, the method comprising:
displaying the stored-value card to a potential consumer, wherein the stored-value card includes a male connector in electrical communication with means for providing illumination from a panel, wherein the male connector is configured to selectively interface with an electrical outlet such that, when the male connector is coupled with the electrical outlet, electricity from the electrical outlet is transferred via the male connector to the means for providing illumination from a panel to cause illumination of the means for providing illumination from a panel, and the stored-value card includes means for linking the stored-value card with at least one of a record and an account having a value associated therewith; and
activating the record or account via the means for linking the stored-value card, to permit subsequent deductions from the value associated with the record or account for application toward one of a purchase and a use of one or more of goods and services.

22. The method of claim 21, wherein the male connector includes at least two pins of an alternating current plug.

23. The method of claim 21, wherein the stored-value card is configured to function as a night light, and displaying the stored-value card includes promoting that the stored-value card functions as the night light.

24. A method of assembling a transaction card, the method comprising:
positioning a circuit, which includes an electrical device coupled with an alternating current electrical plug, relative to a first member;
coupling a second member to the first member to collectively define an enclosure substantially enclosing the circuit therebetween such that at least a portion of the alternating current electrical plug extends out of the enclosure; and
coupling an account identifier to the enclosure, wherein the account identifier links the transaction card to an account or record such that the transaction card can be used during a purchase to apply at least a portion of a value of the account or record toward a price of the purchase.

* * * * *